No. 835,890. PATENTED NOV. 13, 1906.
G. W. RENYX.
PROCESS OF EXTRACTING BUTTER FAT FROM CREAM OR MILK.
APPLICATION FILED SEPT. 14, 1906.
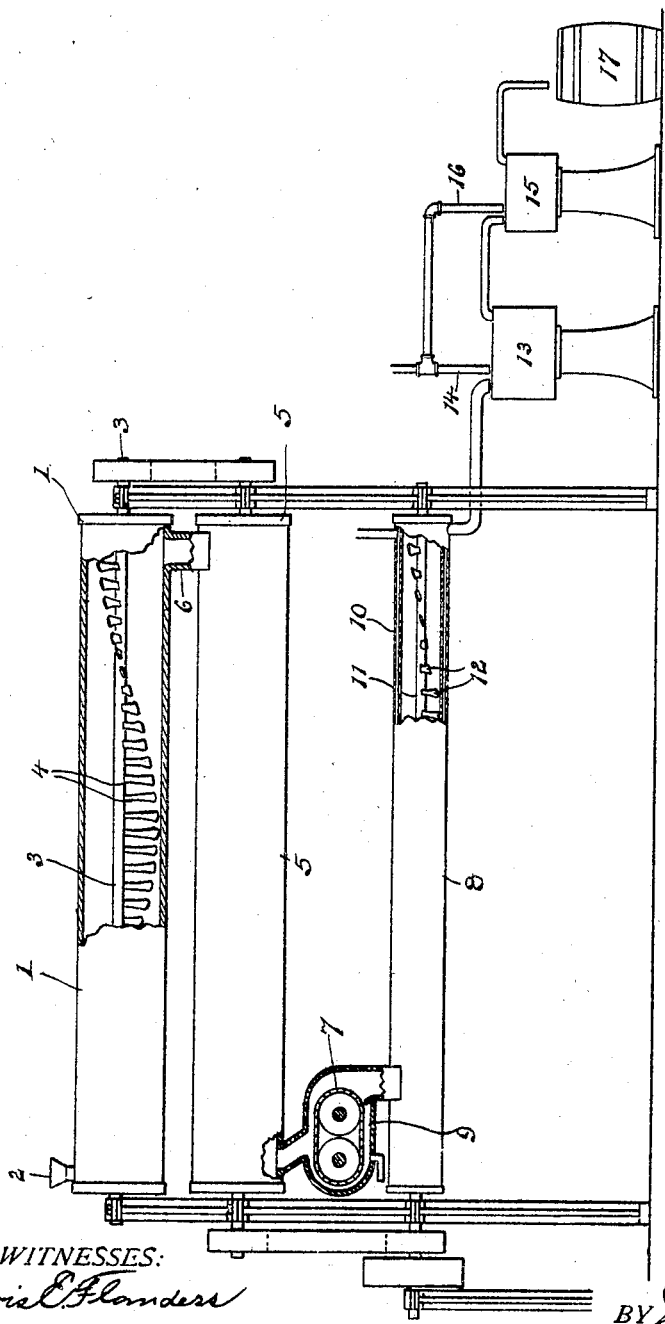
WITNESSES:
INVENTOR.
BY
ATTORNEYS.

UNITED STATES PATENT OFFICE.

GUY W. RENYX, OF LANSING, MICHIGAN.

PROCESS OF EXTRACTING BUTTER-FAT FROM CREAM OR MILK.

No. 835,890.  Specification of Letters Patent.  Patented Nov. 13, 1906.

Application filed September 14, 1906. Serial No. 334,574.

*To all whom it may concern:*

Be it known that I, GUY W. RENYX, a citizen of the United States of America, residing at Lansing, in the county of Ingham and State of Michigan, have invented certain new and useful Improvements in the Process of Extracting Butter-Fat from Cream or Milk, of which the following is a specification, reference being had therein to the accompanying drawing.

This invention relates to a new and useful process for extracting butter-fat from cream or milk; and the object of the invention is to provide a simple method for obtaining in a continuous operation butter-fat in the form of a pure fatty oil directly from milk or cream, which process consists in the several steps of the operation, substantially as hereinafter more fully described, and illustrated in the accompanying drawing, in which the figure is a diagrammatic illustration of the combination and arrangement of means employed to carry out the process.

As illustrated in the drawing, milk or cream of the desired sourness or thickness is run into a suitably-constructed wooden trough or cylinder 1 through a hopper 2 near one end. In the axis of this cylinder is a shaft 3, provided with a series of specially-arranged blades 4, which when the shaft is turned thoroughly beat and stir the milk, breaking the fatty globules and releasing and separating the butter-fat from the milk and at the same time, by reason of their special setting upon the shaft, causing the mass to move toward the outlet end of the cylinder, which end is connected to a similar cylinder 5 below by means of a spout 6, connecting the bottom of cylinder 1 with the top of cylinder 5. The buttermilk and particles of butter-fat contained therein pass through the spout into the inlet end of cylinder 5, where it is again thoroughly beaten or churned to insure the thorough separation of the butter-fat, and then drops through an opening in the bottom of the cylinder at its discharge end onto a suitable separating or draining device 7, which will collect all of the butter-fat from the milk falling upon it and discharge the same into the inlet end of a third cylinder 8, permitting the milk to fall through it into a catch-basin 9, from which it is drawn off in any desired manner. The drain or separator may, as shown, be an endless-revolving slatted carrier moving below the discharge-opening in cylinder 5, upon which the milk containing the particles of butter-fat falls, the milk passing through the interstices between the slats and the fatty particles collecting upon the slats and being carried along and discharged, together with some of the milk adhering to the slats, into the third cylinder. Any other suitable means, such as sieves, may be employed for the purpose of separating or straining out the coalited fatty particles from the buttermilk.

The third cylinder 8 is preferably formed of metal with a water-jacket 10, through which hot water is circulated to thoroughly heat the cylinder, which, like the others, is provided with an axial shaft 11, having spirally-arranged agitating and conveying blades 12 to stir the mass and gradually force it toward the discharge end of the cylinder. The coalited particles of butter-fat are melted in passing through this heated cylinder and issue therefrom at the discharge end thereof in the form of an oil, which is mixed with the buttermilk which passed into the cylinder with the fat, and may also contain other impurities and foreign substances.

To eliminate all impurities or foreign matter and all of the aqueous fluid, leaving only the pure fatty oil, the stream issuing from the heated cylinder is run into a centrifugal separator 13, of any suitable construction, together with an equal amount of pure warm water from a suitable supply-pipe 14, and the oil thus separated is run into a second centrifugal separator 15, of suitable construction, together with an equal amount of pure warm water from a supply-pipe 16. The two separations with pure water thoroughly cleanses the oil and insures the absolute purity of the butter-fat oil, which is conducted into a suitable receptacle 17 to cool.

When the oil is to be taken from cream, it may be found that the use of the first cylinder may be dispensed with and also that it is not necessary to draw off any of the buttermilk, the mass passing directly from cylinder 5 into cylinder 8 without the use of the draining or separating device 7. Under certain conditions one of the centrifugal separators may be dispensed with also.

Having thus fully described my process, what I claim is—

1. The process of extracting butter-fat oil consisting of separating the butter-fat from the milk or cream and causing the fatty particles to coalesce, heating the mass to melt the butter-fat, and separating therefrom the oil thus formed.

2. The process of extracting butter-fat oil consisting of separating the butter-fat from the milk or cream and causing the fatty particles to coalesce, heating the mass to melt the butter-fat, adding warm water to the heated mass, and mechanically separating the oil from the aqueous fluid.

3. The process of extracting butter-fat oil consisting of agitating the milk or cream to break the fatty globules and release and coalite the particles of butter-fat, heating the mass to melt the butter-fat, and mechanically separating the oil thus formed from the mass.

4. The process of extracting butter-fat oil consisting of, first thoroughly breaking up the fatty globules to release the butter-fat, then eliminating from the mass a portion of the buttermilk, heating the remaining portion to melt the butter-fat, and then separating the oil formed by the melting of the butter-fat from the other parts.

5. The process of extracting butter-fat oil consisting of breaking up the fatty globules to release the butter-fat and causing the particles of fat to coalite, separating out and removing a portion of the buttermilk, heating the remaining mass to melt the butter-fat, adding to the mass an equal amount of warm water, and centrifugally separating the oil formed by the melting of the butter-fat from the aqueous fluid and impurities.

In testimony whereof I affix my signature in presence of two witnesses.

GUY W. RENYX.

Witnesses:
DORA G. HIGGINS,
A. WOODMANCY.